D. C. KUFFEL.
SAFETY COUPLING HOOK.
APPLICATION FILED FEB. 3, 1921.
1,375,301.
Patented Apr. 19, 1921.
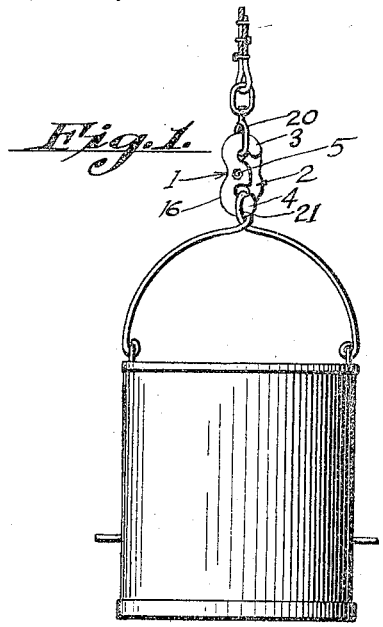
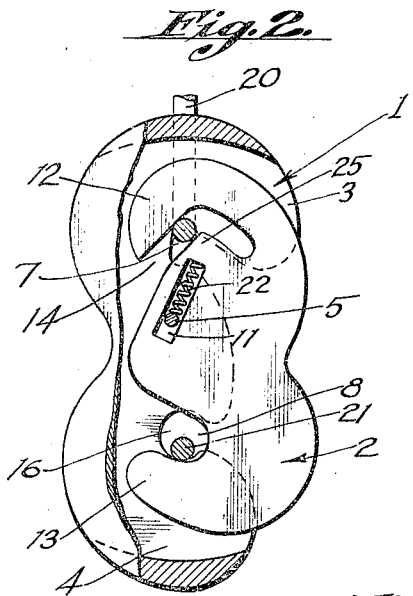
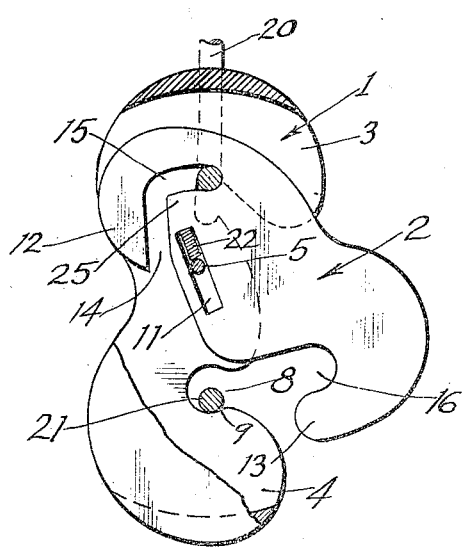
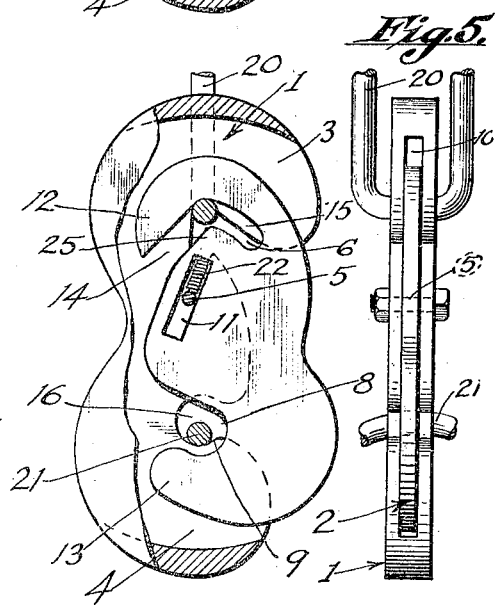
Inventor:
DAVID C. KUFFEL.
By Hazard & Miller
Attorneys.

UNITED STATES PATENT OFFICE.

DAVID C. KUFFEL, OF RANDSBURG, CALIFORNIA, ASSIGNOR OF ONE-HALF TO H. D. WILLIAMS, OF RANDSBURG, CALIFORNIA.

SAFETY COUPLING-HOOK.

1,375,301.  Specification of Letters Patent.  Patented Apr. 19, 1921.

Application filed February 3, 1921. Serial No. 442,113.

*To all whom it may concern:*

Be it known that I, DAVID CLYDE KUFFEL, a citizen of the United States, residing at Randsburg, in the county of Kern and State of California, have invented new and useful Improvements in Safety Coupling-Hooks, of which the following is a specification.

It is the object of this invention to provide a safety coupling hook for attaching buckets and the like to hoisting cables, the device being so arranged as to positively prevent the disengagement of the hook should there be slack in the hoisting line.

The invention will be readily understood from the following description of the accompanying drawings, in which—

Figure 1 is an elevation showing a bucket attached to a hoisting cable by means of a safety coupling hook embodying the principles of my invention.

Fig. 2 is a side elevation of the hook with the parts in coupling position and partly broken away.

Fig. 3 is a similar view showing the start of the relative movement of the parts to disengage the coupling.

Fig. 4 is a similar view showing the parts moved to disengaging position.

Fig. 5 is an end view of the coupling with the parts in the position shown in Fig. 2.

The safety coupling hook consists of the primary hook member 1 and the secondary hook member 2.

The primary hook comprises an upper hook 3, a lower hook 4, and a transverse pin 5 upon which the secondary hook is carried. A passageway 6 leads from the point of hook 3 upwardly and inwardly and terminates in an upwardly extending notch 7. In similar manner the passageway 8 leads inwardly from the point of hook 4, which is preferably rounded, and terminates in a slightly downwardly extending recess 9.

The secondary hook comprises a plate received in a slot 10 extending through the primary hook between the front and rear surfaces thereof, said secondary hook being provided with an elongated inclined slot 11 by means of which it is mounted upon pin 5. The secondary hook includes an upper hook 12 and a lower hook 13, these hooks being oppositely disposed with relation to hooks 3 and 4. A passageway 14 extends inwardly from the point of hook 12 and upwardly at an inclination and then terminates in an inward continuation of said passageway as shown at 15 and which is preferably arranged substantially at right angles to passageway 14 so as to extend inwardly and downwardly. A passageway 16 extends inwardly from the point of hook 13 and the parts are so arranged that when the secondary hook is swung inwardly within the primary hook, the notch 7 at the inner end of passageway 6 will aline with the inner end of passageway 14, and the recess 9 of passageway 8 will aline with the inner end of passageway 16, as clearly shown in Fig. 2, in order that coupling rings 20—21 may be received through the respective openings thus formed.

A spring 22 is provided in slot 11 between pin 5 and the upper end of the slot, and the slot is at such an inclination that, with the parts as above described, the spring will yieldably urge the secondary hook member with relation to the primary hook member so as to maintain the parts in the position described and illustrated in Fig. 2.

With the parts in this position it will be noted that the secondary hook member forms a tapering point 25 at the lower side of the angle formed by passageways 14—15, and that spring 22 will move the secondary hook member with relation to the primary hook member into a position where ring 20 will impinge against said point and thereby prevent pivotal movement of the secondary hook member upon its pivot pin 5.

When the secondary hook member is thus held against movement, the opening provided by alined passageways 8 and 16 and through which ring 21 is received, will be completely surrounded by the two hook members so that it is impossible for the ring to become detached from the coupling, and since spring 22 urges point 25 into position to prevent relative pivotal movement of the hook members irrespective of whether the cable attached to ring 20 is taut or slack, it will be seen that ring 21 cannot be detached until the secondary hook member is manually retracted against the tension of its spring.

When the secondary hook member is thus manually retracted as shown in Fig. 3, point 25 is withdrawn below ring 20, and the second hook member may then be swung upon its pivot 5, ring 20 being received in passageway 15. This relative swinging of the hook members will disengage hooks 3, 4 and 13 as shown in Fig. 4, so that ring 21 may be readily removed. It will be noted that the opening receiving ring 20 will be completely surrounded by hooks 3 and 12 irrespective of the relative position of the primary and secondary hook members, and that as a consequence ring 20 is always held against detachment from the device.

Various changes may be made without departing from the spirit of the invention as claimed.

What is claimed is:

1. A safety coupling hook comprising a primary hook member and a secondary hook member each having hooks at their respective ends, said hook members being assembled with the hooks at their ends extending in opposite directions and overlying one another to define openings extending through the coupling, rings in said opening, said hook members being swingable with relation to one another to close said openings by the respective overlying hooks, means for yieldably sliding said hook members relative to one another to lock the same in such position, said members when reversely slid relative to one another being adapted for reverse swinging movement to disengage the overlying hooks at one end of the device so as to permit of removal of the ring positioned in the opening defined by said hooks.

2. A safety coupling hook comprising a primary hook member and a secondary hook member each having hooks at their respective ends, said hook members being assembled with the hooks at their ends extending in opposite directions and overlying one another to define openings extending through the coupling, rings in said openings, said hook members being swingable with relation to one another to close said openings by the respective overlying hooks, a tapering point upon the secondary hook member at the opening defined by the overlying hooks at one end of the device, means for yieldably sliding said hook members relative to one another to cause said point to be impinged by the ring in said opening for preventing relative rotation of said hook members from a position closing said openings, said point being disengaged from said ring when the members are reversely slid relative to one another, so that the members may be reversely swung relative to one another so as to disengage the overlying hooks at the opposite end of the device for permitting of removal of the ring positioned in the opening defined by said hooks.

3. A safety coupling hook comprising a primary hook member and a secondary hook member slidably received in the same, each of said hook members having hooks at their respective ends, said hook members being assembled with the hooks at their ends extending in opposite directions and overlying one another to define openings extending through the coupling, rings in said openings, said hook members being swingable with relation to one another to close said openings by the respective overlying hooks, a tapering point upon the secondary hook member at the opening defined by the overlying hooks at one end of the device, the primary hook member having a slot therein and a bearing pin upon the secondary hook member received in said slot, a spring in said slot between the end of the same and said pin adapted to yieldably slide said hook members relative to one another to cause the tapering point to be impinged by the ring in the above mentioned opening for preventing relative rotation of said hook members from a position closing said openings, said point being disengaged from said ring when the members are reversely slid relative to one another against said spring so that the members may be reversely swung relative to one another so as to disengage the overlying hooks at the opposite end of the device for permitting of removal of the ring positioned in the opening defined by said hooks.

In testimony whereof I have signed my name to this specification.

D. C. KUFFEL.